June 5, 1962 W. T. RENTSCHLER 3,037,440
PHOTOGRAPHIC CAMERA WITH ELECTRIC EXPOSURE REGULATOR
Filed July 15, 1958 2 Sheets-Sheet 1
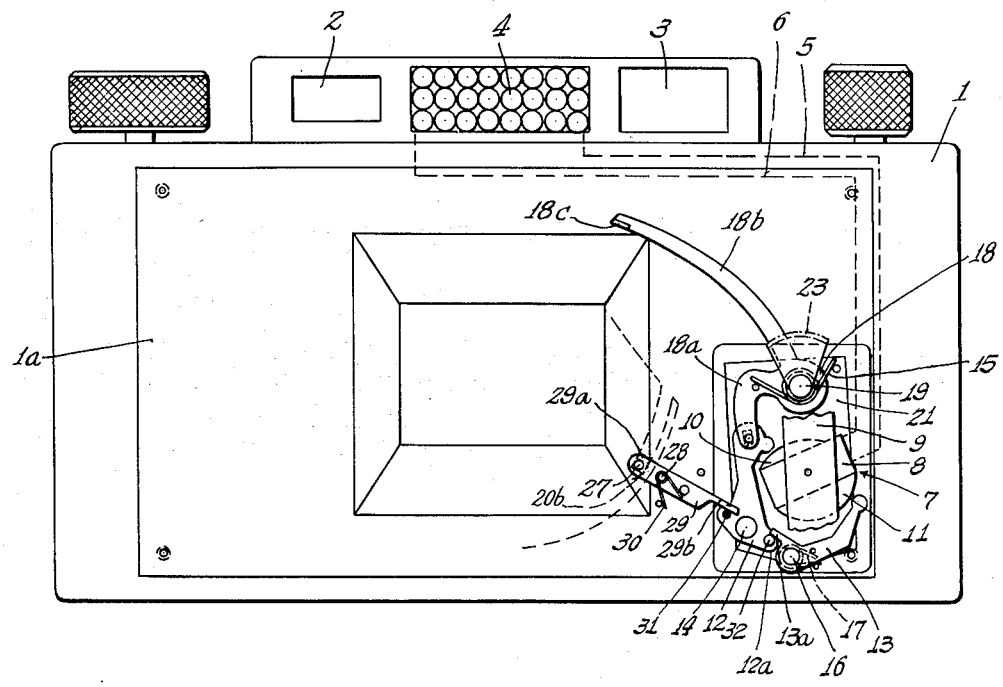
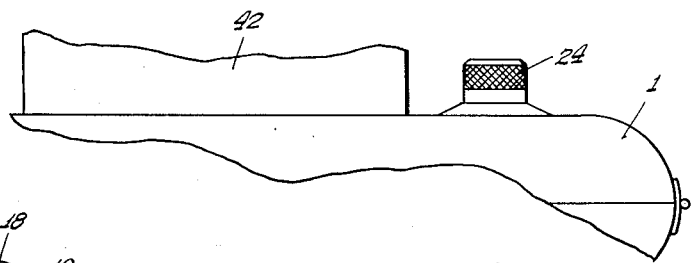
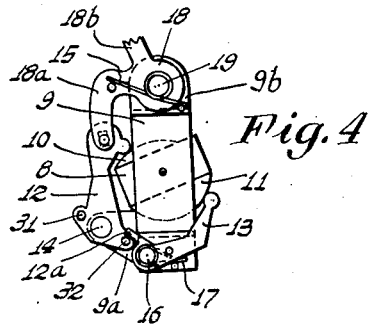
INVENTOR.
Waldemar T. Rentschler
BY
Munn, Liddy, Daniels & March
ATTORNEYS June 5, 1962 W. T. RENTSCHLER 3,037,440
PHOTOGRAPHIC CAMERA WITH ELECTRIC EXPOSURE REGULATOR
Filed July 15, 1958 2 Sheets-Sheet 2

INVENTOR.
Waldemar T. Rentschler
BY
Munn, Liddy, Daniels & March
ATTORNEYS

United States Patent Office 3,037,440
Patented June 5, 1962

3,037,440
PHOTOGRAPHIC CAMERA WITH ELECTRIC
EXPOSURE REGULATOR
Waldemar T. Rentschler, Calmbach (Enz), Germany, assignor to Alfred Gauthier G.m.b.H., Calmbach (Enz), Germany, a corporation of Germany
Filed July 15, 1958, Ser. No. 748,724
Claims priority, application Germany July 19, 1957
1 Claim. (Cl. 95—64)

This invention relates to photographic cameras of the type having electric exposure regulators wherein the position of the movable part of an electric measuring device, through the medium of a tracing means and mechanical transmission, determines the proper setting of an exposure setting member (as for example a speed-setting member, diaphragm-setting member, or exposure-value setting member).

In cameras of the above type it has been the practice heretofore to constitute the measuring device and the members of the tracing and transmission means associated therewith, which are mounted in the camera housing and are responsive to the positioning of the movable part of the measuring device, as separately mounted entities, each separate and distinct from the others. In consequence of this, the adjustment of such members and also any checks as to the calibration thereof must be made after they have been completely assembled to the camera. Therefore the assembly of the camera is rendered more difficult and time-consuming, and requires the use of more highly trained workmen or personnel.

The above drawbacks and disadvantages of this prior construction are obviated by the present invention, and one object of the invention is to provide a novel and improved camera construction which is characterized by greater simplicity and economy in the fabrication and assembly of parts, and by an assembly which is more readily and quickly understood.

In accomplishing this, in accordance with the invention, I arrange the measuring device and the movable part thereof, together with the members of the tracing and transmission means which are controlled by said movable part, so that these are constituted as a separate and distinct unitary assemblage, preferably completely enclosed apart from the remainder of the camera construction.

By such organization, in accordance with the invention, it is possible to check and adjust the various co-acting components and the entire subassembly constituted thereby, constituting the measuring device, tracing and transmission means, in a simple and convenient manner prior to assembly of such unit to the camera and independent of the camera construction. Therefore the operations required in assembling the remainder of the camera construction are only of a simple mechanical nature, involving attachment of the said unitary assemblage, which has already been checked and adjusted, to the camera housing. By virtue of this, the assembly of the camera may be more easily and economically carried out, and also because of the simplicity of the operations now required such assembly may be readily and effectively done by untrained or unskilled personnel. The assembly, checking and adjustment of the said unitary assemblage, on the other hand, may be done by specialized skilled workers especially trained for the task.

In order to advantageously mount the said unitary assemblage without imposing restrictions on it and on the camera housing a special mounting means may be provided, which carries the said assembly and is adapted for quick and easy attachment to the camera.

In connection with said mounting, I have found it to be of advantage to protect the entire assemblage against external influences, and accordingly the said supporting means may be constituted as a closed housing which contains the assemblage and is itself attached to the camera structure.

Also, the supporting frame structure which mounts the movable part of the electrical measuring device may be utilized as a base or support for the members of the tracing and transmission means, and by such organization fewer parts are needed while at the same time greater simplicity is achieved and also a consequent having of space.

An advantageous location for the said novel unitary assemblage, as provided by the invention, is in the front portion of the camera housing, preferably adjoining the front wall thereof.

In conjunction with such disposition of the unitary assemblage, the exposure setting member may be located in a plane near the camera front wall, and to the rear of the lens shutter construction, thereby resulting in a simplified cooperative relationship and a desirable reliability of function, as well as a further compactness and saving of space.

Moreover, with the above organization exposure factors other than shutter speed, diaphragm opening, and speed-diaphragm ratio may be readily taken into account by constituting the measuring device, tracing and transmission means as a single unitary assemblage, without complicating or altering the functioning of the measuring device. In accomplishing this, the unitary assemblage is mounted so as to be shiftable with respect to the exposure setting member, to enable different relationships to be established therebetween for altering in a predetermined manner the control of the positions of the said settable member. By arranging an indicator means to enable the different adjusted positions of the unitary assemblage to be determined, the said additional exposure factors may be easily and quickly taken into consideration. Such indicator means may, for example, comprise a scale and a cooperable index mark disposed so as to be readily visible at the exterior of the camera.

The shifting or adjustment of the unitary assemblage may be effected in a simple and economical manner which at the same time provides for reliability in its functioning and accuracy, by constituting the mounting means for such assemblage as a spindle or pivot, and such pivot may advantageously constitute the pivotal mounting for the transmission means or member which is cooperable with the exposure setting member and which is controlled as regards its position by the movable part of the measuring device.

In order to provide in a simple and unrestricted, detachable manner a means for effecting the shifting or adjusting of the said unitary assemblage a gear train may be advantageously provided in conjunction with the said pivotal or spindle-type mounting means, and such gear train may be actuated by a manually operable or turnable knob which is located at the exterior of the camera. This arrangement has the further advantage that a large ratio may be provided between the knob and the said unitary assemblage, thereby to enable the latter to be easily and quickly shifted or adjusted by small increments in response to relatively large turning movements of the knob.

In the accompanying drawings two different embodiments of the invention are illustrated.

FIGURE 1 is a front elevational view showing schematically a photographic camera having an electric exposure regulator, including an electric measuring device, tracing and transmission means as provided in accordance with the invention. To reveal interior structures the front cover plate of the camera and other cover members are not shown.

FIG. 2 is a front elevational view of the camera shown in FIG. 1, but with the front cover plate replaced. In this figure there is further illustrated by broken outlines the cooperable relationship between the exposure setting member and the transmission means associated with the measuring device, and also shown a setting means adapted to enable additional exposure factors to be taken into consideration, such as film sensitivity and the like.

FIG. 3 is a fragmentary edge elevational view of the camera of FIGS. 1 and 2, showing a portion of the lens assembly, and showing in side elevation the manually adjustable knob by which the additional exposure factors may be taken into consideration.

FIG. 4 is a fragmentary elevational view of a measuring device with movable part, tracing and transmission means illustrating another embodiment of the invention.

Figure 2:
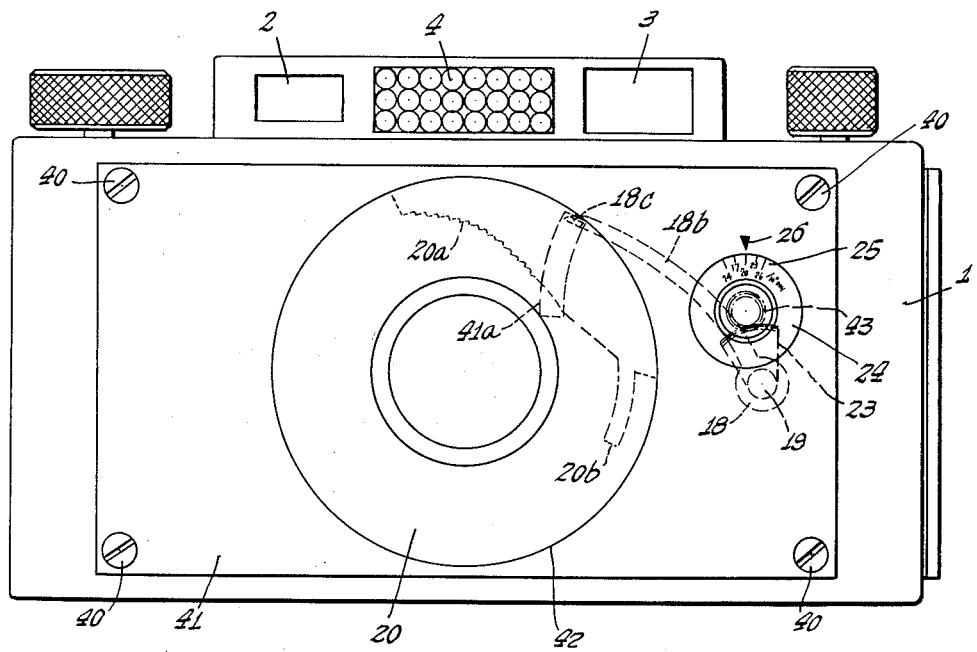

Referring to FIGS. 1, 2 and 3 the housing of the photographic camera illustrated therein is designated by the numeral 1. Along one edge of the housing 1 there is provided a well-known photo-sensitive element 4, disposed between windows 2 and 3 of a well-known range finder. The photosensitive element 4 is electrically connected with a measuring device 7 by means of wires 5 and 6 which are illustrated by broken lines. The measuring device 7 is of well-known construction, and comprises an electrical instrument movement such as that commonly referred to as a D'Arsonval movement, said device having a movable part including a driving coil 8, carried by suitable pivots on a supporting frame 9.

As seen in FIGS. 1 and 4, the movable part of the measuring device 7 may further include a cam part 10 and a brake part or shoe 11, said parts being cooperable with pincer-shaped levers 12 and 13 carried respectively by spindles 14 and 16. The levers 12 and the cam part 10 associated therewith constitute the tracing means of the electric exposure regulator, whereas the lever 13 and the brake part 11 constitute a braking or locking means by which the movable part of the measuring device 7 is fixedly secured in any of its various adjusted positions after it has initially responded to the energy from the photosensitive element 4, said securing or locking of the movable part being effected prior to and being maintained during the tracing procedure.

A transmission means is provided by which a control is effected over the positions of an exposure setting ring 20 (FIG. 2) as determined by the adjusted positions of the movable part of the measuring device, including the coil 8 thereof, and also the tracing lever 12, and such transmission means includes a two-armed lever 18 which is pivotally carried by a spindle 19. One arm 18a of the lever 18 is coupled to the tracing lever 12 by means of a pin-and-slot connection as shown in FIGS. 1 and 4. A spring 15 is provided, carried by the spindle 19, said spring biasing the transmission lever 18 in a counter-clockwise direction, thereby tending to urge the tracing member 12 into engagement with the tracing cam 10 of the movable part of the measuring device. The transmission lever 18 has a second arm 18b provided with a bent lug 18c which is adapted to cooperate with a stepped edge 20a of the exposure setting member or ring 20 in such a way that a control will be effected over the positioning of the setting ring as determined by the adjusted positions of the tracing member 12 and the movable part of the measuring device 7, including the coil 8. The stepped edge 20a is nonconcentric with respect to the axis of turning of the exposure setting ring 20, and accordingly different angular positions of the transmission lever 18 will intentionally result in interference with clockwise turning of the setting ring 20 and will effect engagement of the lug 18c with different steps on the edge 20a, thereby adjustably limiting the clockwise setting movement of the ring 20.

In accordance with the present invention, the measuring device 7 locking lever 13, tracing lever 12 as well as the transmission lever 18 is constituted as a separate and distinct, unitary assemblage, having several distinct, important functional purposes.

The said assemblage not only comprises the above components or members but also accompanying supporting structure, forming therewith a distinct unit as illustrated in the embodiment of the invention of FIG. 1, with the various components or parts of the assemblage carried by a specially arranged support which is adapted to be attached or affixed to the camera structure in a novel manner, shortly to be described.

By such organization there is provided an independent, readily detachable and unrestricted construction of the said components and unitary assemblage, and obtained as well a desirable ease in mounting together with a simplified and more facile assembly of the camera.

In the embodiment of FIG. 1, the special supporting means is constituted as a plate 21, to effect simplicity and reliability of function Moreover, the said supporting means may be constituted just as well by an enclosure or closed housing which entirely contains most of the assemblage, particularly the interacting portions thereof which are immediately associated with the measuring device 7. By the provision of the mounting means in the form of a closed housing there is the added advantage that the assemblage contained therein is protected against damage from misuse, rough handling, or other exterior influences, as well as protected from dust, dirt, and gross humidity influences, both prior to attachment to the camera structure and after incorporation therein.

An especially advantageous arrangement of the said unitary assemblage, from the standpoint of effecting a saving in components and space, is shown in FIG. 4 wherein the supporting structure 9 for the movable part and coil 8 of the measuring device is also constituted as a support or base for other components of the assemblage. For this purpose, two lugs 9a and 9b are provided on the frame 9, the said lugs carrying spindles 14, 16 and 19 on which the tracing lever 12, locking lever 13 and transmission lever 18 respectively are carried.

In the illustrated embodiment of the invention shown in FIGS. 1 and 2 the said unitary assemblage is mounted within the housing of the camera in a front portion 1a thereof. This enables the assemblage to be easily and quickly put in place and secured, since such location is readily accessible when the front cover 41 of the camera is removed. Moreover, such disposition of the unitary assemblage may be readily effected for the most part without altering, at least to any appreciable extent, the normal camera construction, since in general there exists in the front portion of the housings of well-known cameras not employing exposure regulators a certain amount of unused space, located for example between the light pit and the film coil area or room. Such space may, in accordance with the invention, be readily utilized for the accommodation of the unitary assemblage provided herein. Moreover, the provision of a front plate 41 in such camera, which is held in place as by screws 40, FIG. 2, effects a complete covering of the said unitary assemblage and thus protects the latter from external influences as well as providing a closed exterior. In conjunction with the disposition of the unitary assemblage in the front portion of the camera housing, it is advantageous to locate the exposure setting member of the camera in a plane near the camera front wall, since this effects a saving of space and components and also enables an effective and reliable control of the setting member to be had by the transmission lever 18. In accomplishing the foregoing, as effected in the illustrated embodiment of the invention, the exposure setting ring 20 is located at the rear of the lens shutter 42 (FIGS. 2 and 3) which is carried at the front of the camera plate 41. By such organization the control of the exposure setting member 20 as effected by the movable part including the coil 8 of the measuring device 7 may be had through the medium of but a single transmission member, namely the lever 18. In carrying out such control, an arcuate slot 41a (FIG. 2) is provided in the front plate 41 of the camera, through which the lug 18c of the transmission lever 18 may extend.

Depending on the particular intended construction and operation of the camera, the setting ring 20 may be utilized for adjusting either the diaphragm opening, or the shutter speed, or else an exposure value such as might be constituted by a speed-diaphragm ratio. Moreover, in accordance with the invention, other exposure factors may be taken into consideration, in addition to shutter speed, diaphragm opening and speed-diaphragm ratio, and such other factors are possible without altering the structure or functioning of the measuring device 7. This is accomplished, in accordance with the invention, by adjustably mounting the said unitary assemblage comprising the measuring device and tracing and transmission means so that such assemblage may be shifted with respect to the exposure setting member 20, and by arranging a scale or equivalent indicator means to provide values indicative of the said additional exposure factors. Such setting scale may be fixedly mounted on the camera housing and made cooperable with a movable index mark carried by the unitary assemblage, or the scale may be movable with the said assemblage and cooperble with a fixed index mark, this latter arrangement being shown in FIG. 2.

In the illustrated embodiment of the invention the mounting means of the said unitary assemblage is constituted as a pivotal mounting on the camera, thereby at one and the same time avoiding interference with other structures of the camera and effecting a desirable economy in manufacture, said pivotal mounting comprising a spindle which also constitutes the support for the transmission lever or member 18. In this organization, the spindle 19 serves as such pivotal mounting, said spindle being fixedly carried by or attached to the mounting plate 21 and having a bearing in a suitable bore of the camera housing (not shown).

For the purpose of readily and effectively shifting or adjusting the unitary assemblage thus mounted from a location at the exterior of the camera there is provided a gear train which has a driving connection with such assemblage. This gear train comprises a toothed segment 23 fixedly attached to the spindle 19 and thus to the mounting plate 21, said segment engaging a pinion 43 which is turntable with a manually engageable actuating knob 24 disposed at the exterior of the front camera plate 41.

By the provision of the said gear train it is possible to effect an advantageous ratio of movement, such that the knob 24 will have a greater travel than that of the unitary assemblage which is mounted on the spindle 19. By such greater movement of the knob 24 a finer adjustment of the said unitary assemblage is made possible, and at the same time an expanded scale may be utilized in conjunction with the knob, to facilitate the reading of various values representative of the additional exposure factors which are to be taken into consideration. Moreover, by the provision of the said gear train there is possible a ready detachability and appreciable leeway or freedom of positioning and mounting, as regards the adjustable unitary assemblage and the adjusting knob therefor. Thus, the device of the invention can be readily adapted in the simplest and easiest manner to the respective conditions and structures of various types of cameras, and the adjusting knob may be easily arranged at an accessible location at the exterior of the camera, which is to a great extent independent of the location and mounting of the measuring device assemblage.

As shown in FIG. 2, the knob 24 may be provided with a film sensitivity scale 25 which then serves as the setting scale for the said unitary assemblage. Cooperable with the film sensitivity scale 25 is an index mark 26 which is fixedly carried by the front camera plate 41. In place of the film sensitivity scale 25, other scales may be provided, to take into consideration other exposure factors. For example, filter factors, or exposure factors dependent on light conditions, either speed or diaphragm, could be taken into account by the use of a suitable scale on the knob 24, in conjunction with the adjustably mounted assemblage as provided by the invention. The provision of either a speed or a diaphragm value at the scale 25 may be important, depending on whether the setting member 20 which cooperates with the transmission lever 18 is a diaphragm setting member or a speed setting member, where that factor which is not covered by the setting member must be taken into consideration in some other manner when setting the exposure. In such event, the shifting movement of the said unitary assemblage can be coupled or correlated with the shifting movement of an exposure setting member different from the setting member 20.

In order to obtain accurate settings of the coil 8 of the measuring device 7 in accordance with the existing light conditions it is necessary that the coil respond in a sensitive manner to the current supplied to it by the photosensitive element 4. In order to make this possible, there is provided by the invention a device which holds the tracing lever 12 and the locking lever 13 out of engagement with the respective associated parts of the measuring device at the time that the light values on the subject are to be made use of. This device provided by the invention is coupled with the exposure setting ring 20 in order to effect a simple and reliable mode of operation of the camera, and such coupling is so arranged that the two levers 12 and 13 are moved to their disengaged positions in response to movement of the exposure setting ring 20 to one extreme position, herein termed a starting position and shown in FIGS. 1 and 2. In the embodiment of the invention illustrated in FIG. 1 the said device which effects disengagement of the tracing and locking levers is constituted as a two-arm lever 29 which is pivotally carried on a fixed spindle or pivot 28. One arm 29a of the lever 29 cooperates by means of a pin 27 with a stop shoulder 20b (FIG. 2) provided on the exposure setting ring 20, whereas the remaining arm 29b of the lever 29 is adapted to abut a pin 31 which is rigidly mounted on the tracing lever 12. A coil spring 30 is mounted on the fixed pivot 28, said spring continually biasing the lever 29 in a counterclockwise direction so as to maintain the pin 27 thereof in a position of rest, engaged with the stop shoulder 20b of the exposure setting ring 20.

Referring to FIG. 1 the said lever-disengaging device is shown in the position which it occupies when the exposure setting ring 20 is in its starting position. For such position the lever 29 has been shifted by the stop shoulder 20b of the ring 20 in a clockwise direction against the action of the coil spring 30 and such lever 29 has shifted the tracing lever 12 out of engagement with the tracing cam part 10 of the measuring device. The transmission lever 18 has also been shifted by such movement of the tracing lever 12, as will be understood, against the action of the coil spring 15 which normally tends to maintain the tracing lever 12 in engagement with the cam 10. For these conditions lug 18c of the transmission lever 18 as seen in FIG. 2 is disengaged from the stepped edge 20a of the exposure ring 20. The two levers 12 and 13 associated with the measuring device 7 are coupled to each other by an abutting, biased connection, also commonly termed a "connection by power," for the purpose of disengaging the locking lever 13 from the brake shoe 11 at the same time that the tracing lever 12 is disengaged from the cam part 10. Moreover, the said coupling by power is so arranged that when the levers 12 and 13 are freed for re-engagement with the movable part of the measuring device 7 the locking lever 13 will always first become engaged with the brake part or shoe 11 of the measuring device before the tracing lever 12 becomes engaged with the tracing cam 10. For the purpose of effecting the said connection or coupling by power between the two levers 12 and 13 the said levers are constituted as two-armed levers having coupling arms 12a and 13a which are not intended for engagement with the movable part of the measuring device 7. To effect the said coupling by power a pin 32 is mounted on the lever arm 12a, said pin being engageable with the arm 13a of the locking lever 13. The biasing means which effects the connection by power comprises a spring 17 which is mounted on the spindle 16 of the locking lever 13 and which biases the locking lever 13 counterclockwise, that is, in a manner which tends to maintain the arm 13a of the locking lever in engagement with the pin 32 on the arm 12a of the tracing lever. At the same time, the spring 17 tends to maintain the locking lever 13 in engagement with the locking or brake part 11 of the measuring device.

The procedure by which an exposure setting is effected, taking into consideration film sensitivities, is as follows:

In order to set a speed-diaphragm ratio the exposure setting ring 20 is first returned from a previous adjusted position to the starting position as shown in FIGS. 1 and 2. At the end of such returning movement the tracing lever 12 and the locking lever 13 will be disengaged from the cam and locking parts 10 and 11 respectively of the measuring device 7, through the medium of the parts 20b, 27, 29, 31 and 13a, 32 respectively. In consequence of this, the movable part, including the coil 8, of the measuring device 7 will be freely movable insofar as the levers 12 and 13 are concerned, so that it can respond in a sensitive manner to the current supplied by the photosensitive element 4 as effected by the existing light conditions.

After the movable part of the measuring device 7 has so responded, the setting ring 20 is moved in a clockwise direction, and at the beginning of such movement release of the levers 12 and 13 will be effected in consequence of counter clockwise turning of the lever 29. Under the action of the springs 15 or 17 respectively the levers 12 and 13 will be brought into engagement with the cam part 10 and the brake part 11. In connection with such engagement it is to be noted that the braking or locking lever 13 is first engaged with the brake part 11, after which the tracing lever 12 becomes engaged with the cam part 10. In response to positioning of the tracing lever 12 by the cam part 10, the transmission lever 18 will be shifted in a manner to locate the lug 18c thereof in the path of movement of the stepped edge 20a of the exposure setting ring 20, and such lug will become engaged with one of the steps or notches of said edge as the exposure setting ring 20 is moved clockwise. The position of the lug 18c will in consequence be indicative of the adjusted position of the movable part including the coil 8 of the measuring device 7, as effected by the existing light conditions.

As the exposure setting ring 20 is turned clockwise one of the notches or steps of the edge 20a thereof will become engaged with the lug 18a of the transmission lever 18, and by such engagement the ring 20 will be halted in its movement and brought to a particular adjusted position. Thus, for the particular film sensitivity indicated by the scale 25 of the knob 24, the desired exposure factor of the camera has been set by the said clockwise movement of the setting ring 20.

If a film is to be used which has a sensitivity different from one previously used, then the new sensitivity is also set at the camera. For this purpose the actuating knob 24 (FIGS. 2 and 3) is shifted or turned until the proper number on the scale 25 is brought into coincidence with the index mark 26. Such number is of course that which corresponds to the sensitivity of the film which is being used. By so turning the knob 24 the gear train comprising the parts 23, 43 is actuated, thereby shifting the unitary assemblage including the measuring device 7 and tracing and transmission members associated therewith to a new position wherein the stop lug 18c of the transmission lever is changed in its relation to the stepped edge 20a of the exposure setting ring 20. For such new relation the existing light conditions may now readjust the measuring device, tracing lever, transmission lever 18 and lug 18c to conform to the light values as scanned by the photosensitive element 4, in a manner already described above in detail. Thus it will be seen that for any given film sensitivity, as determined by the knob 24, a semiautomatic adjustment of the exposure setting member 20 will be effected and different film sensitivities may be taken into account by readjusting the knob 24 whereupon the changed position of the unitary assemblage will take into account the new film sensitivity while at the same time the said assemblage continues to effect a proper control over the exposure setting ring 20.

The construction and arrangement of the supporting means for the measuring device 7 and of the parts or components of the tracing means and transmission means which are controlled by the movable part of the measuring device may be carried out in various ways. However, in the various executions of these components it is important that the measuring device and the associated parts comprising the tracing lever, locking lever and transmission means or lever be constituted as a special, separate unitary assemblage complete in and of itself and preferably enclosed in a separate individual housing. By such organization a simplified and economical construction and assembly of the camera will be obtained, as well as a high degree of accuracy and reliability in the functioning of the device. This is because the said interrelated parts and components are all mechanically mounted and associated with each other in a separate unit which is independent of the camera construction, and which may be fabricated under rigid and exacting manufacturing conditions.

I claim:

A photographic camera of the type having an exposure setting member comprising a photo-sensitive electric element connected to an exposure regulator provided with an electric measuring device having an armature movable part means the position of which determines the proper setting to be given the setting member, a unitary assemblage separate and distinct from the camera housing and comprising a base, said measuring device and movable part means thereof mounted on said base, said armature movable part including a cam, a tracing lever pivotally mounted on said base having one end in following arrangement on said cam; a transmission lever means pivotally mounted on said base and having an end adapted to cooperate with said tracing lever means, said transmission lever means having the other end in cooperating relationship with said exposure setting member to provide a stop therefor, a braking lever means pivotally mounted on said base, one end portion urged towards one portion of said cam to frictionally restrict movement thereof, said unitary assemblage being removably disposed within the housing of the camera adjacent the front portion of said housing.

References Cited in the file of this patent

UNITED STATES PATENTS

| | | |
|---|---|---|
| 2,178,361 | Riepert | Oct. 31, 1939 |
| 2,297,262 | Tonnies | Sept. 29, 1942 |
| 2,343,690 | Mihalyi | Mar. 7, 1944 |

FOREIGN PATENTS

| | | |
|---|---|---|
| 667,821 | Germany | Nov. 21, 1938 |
| 921,733 | Germany | Dec. 23, 1954 |